United States Patent [19]

Hamisch, Sr.

[11] 3,711,683
[45] Jan. 16, 1973

[54] RE-PRICE MARKING METHOD AND RECORD MEMBER

[75] Inventor: Paul H. Hamisch, Sr., Dayton, Ohio
[73] Assignee: The Monarch Marking System Company, Dayton, Ohio
[22] Filed: Jan. 8, 1971
[21] Appl. No.: 104,878

[52] U.S. Cl. .............................235/61.12 N, 283/56
[51] Int. Cl. ...........................G06k 19/00, G09f 1/02
[58] Field of Search.235/61.12 R, 61.12 N, 61.12 M, 235/61.11 E; 283/56, 18, 21, 29, 60, 62

[56] References Cited

UNITED STATES PATENTS

| | | | |
|---|---|---|---|
| 3,469,033 | 9/1969 | Becking et al. | 235/61.12 R |
| 3,211,470 | 10/1965 | Wilson | 235/61.12 R |
| 3,271,227 | 9/1966 | Jaeckel | 156/556 |

Primary Examiner—Daryl W. Cook
Attorney—Joseph J. Grass

[57] ABSTRACT

There is disclosed a re-price marking method and record member. Using one record member such as a ticket, tag or label, fields of data, such as inventory control, style and price data fields are printed on the one record member. Each field has both binary code machine readable data and human readable data. Re-price marking is accomplished by printing a new price in both binary code machine readable price data and human readable price data on another record member, and adhesively securing the other record member over the price field on the one record member but not over the other field or fields on the one record member. The result is a re-price marked binary code and human readable record member.

16 Claims, 7 Drawing Figures

INVENTOR
PAUL H. HAMISCH, SR.
PAUL H. HAMISCH, JR.

FIG-5
FIG-6
FIG-7
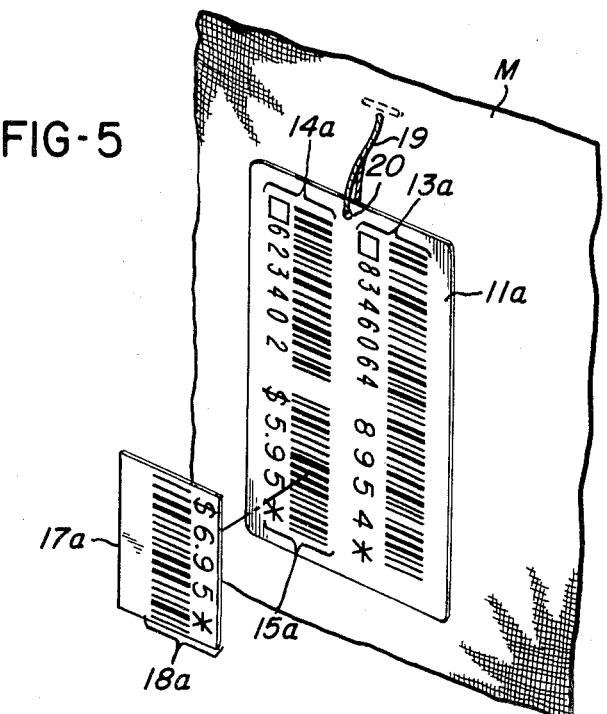
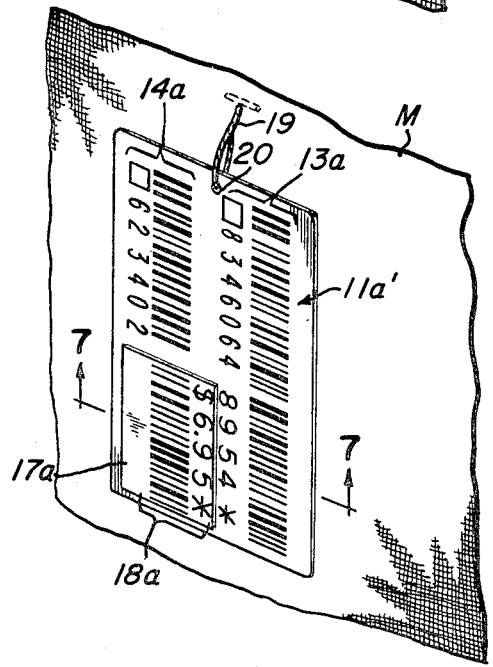
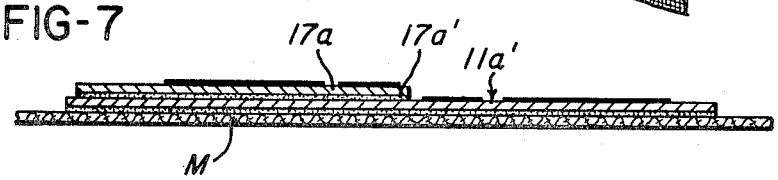

RE-PRICE MARKING METHOD AND RECORD MEMBER

BACKGROUND OF THE INVENTION

1. Field of the Invention

This invention relates to the art of re-price marking merchandise using printed records such as tickets, tags and labels.

2. Brief Description of the Prior Art

One prior art method of re-price marking merchandise involves using a human readable record member and either crossing out the old price and writing the new price directly on the record member, or applying a human readable record member bearing a human readable new price over a record member bearing the human readable old price. Another prior art method involves removing the record member bearing the old price from the merchandise and completely replacing it with another record member bearing the new price.

SUMMARY OF THE INVENTION

This invention is directed specifically to a method of re-price marking merchandise using printed record members, and specifically to re-price marking record members. In accordance with the method of the invention, a first record member such as a ticket, tag or label is provided. At least two fields of data are printed on the first record member. Each field includes machine readable binary code data and preferably also human readable data. Alternatively, the binary code data and human readable data can be combined as is disclosed in U.S. Pat. No. 3,044,696. One of the fields is a price field containing price data. The first record member is attached to merchandise and means are provided for this purpose. If it is desired to change the price of the merchandise, by either marking the price up or down, without changing permanent data such as an inventory control number in one field, a style number in another field, and so on, then a second record member is provided. A new price field is printed on the second record member in the form of binary code machine readable price data and preferably also in human readable price data. Thereafter, the second record member is adhesively secured to the first record member to cover at least the binary code price data but not the binary code machine readable price data in the other field or fields on the first record member, thereby providing a re-price marked record member. When the re-price marked record member is ready to be read, the new price field on the second record member and the other field or fields on the first record member are optically scanned. The merchandise can be re-price marked again by removing the second record member as for example at the end of a sale provided the second record member is backed with removable type adhesive.

BRIEF DESCRIPTION OF THE DRAWINGS

FIG. 5 is a perspective view of a first record member in the form of a tag attached to merchandise showing additionally a second record member ready to be adhered to the first record member;

FIG. 6 is a perspective view of the first record member, shown in FIG. 5, attached to merchandise, showing the second record member adhered to the first record member to effect re-price marking; and FIG. 7 is a sectional view taken along line 7—7 of FIG. 6.

DETAILED DESCRIPTION OF THE PREFERRED EMBODIMENTS

Figure 1:
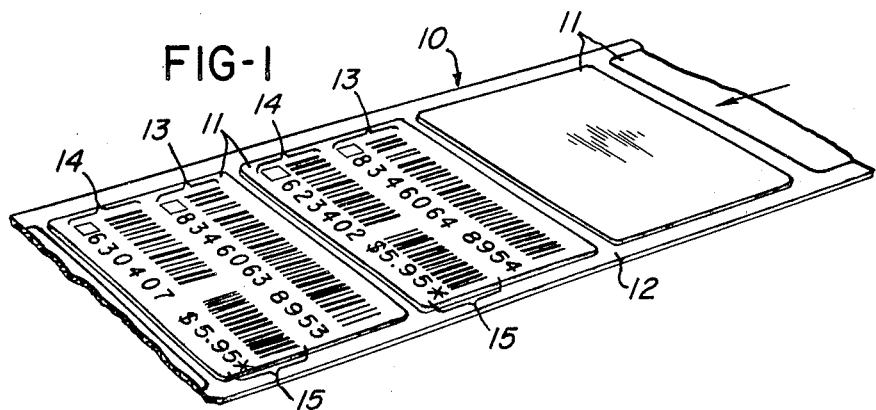
FIG. 1 is a perspective view of record members in the form of pressure sensitive labels releasably carried by a web of backing material, with printed data shown on two of the labels.
Figure 2:
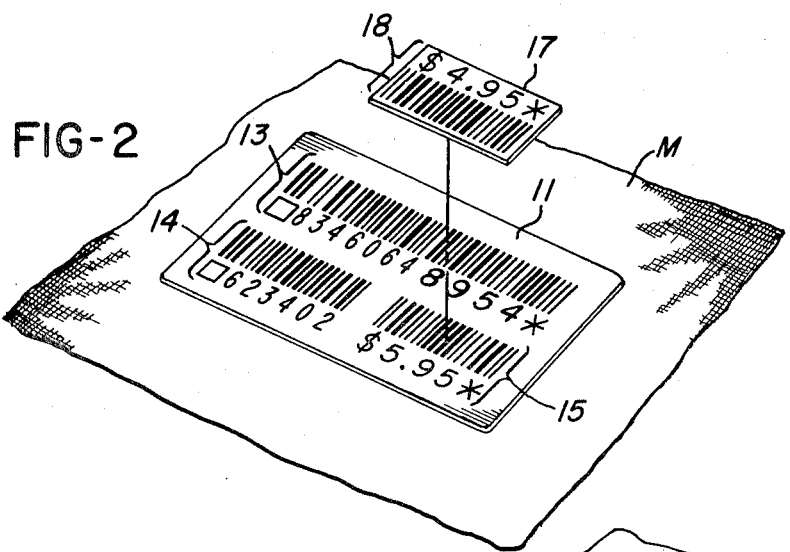
FIG. 2 is a perspective view of a first record member attached to merchandise, showing additionally a second record member ready to be adhered to the first record member.
Figure 3:
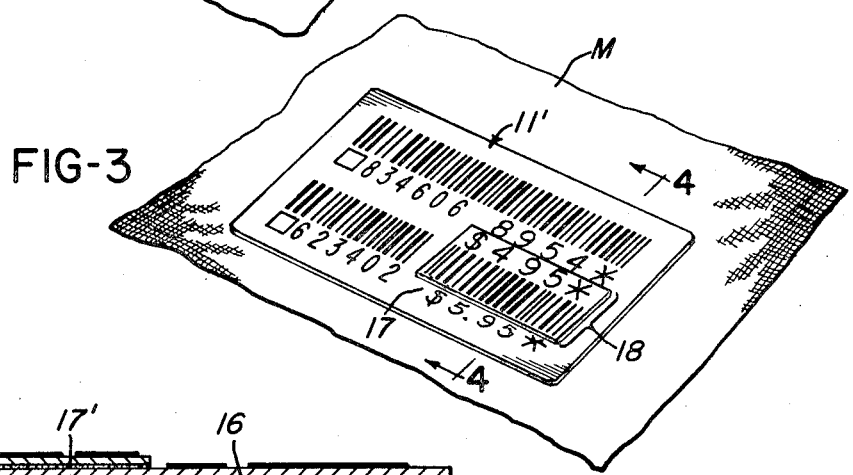
FIG. 3 is a perspective view of the first record member attached to merchandise, showing the second record member adhered to the first record member to effect re-price marking.
Figure 4:
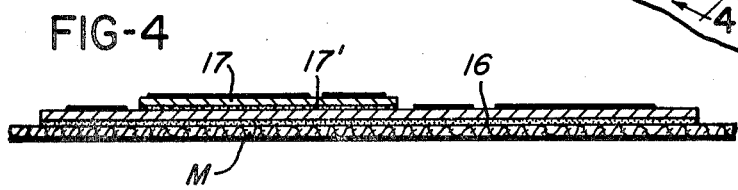
FIG. 4 is a sectional view taken along line 4—4 of FIG. 3.

Referring to FIG. 1, there is shown a web generally indicated at 10 of record members 11 in the form of pressure sensitive labels adhesively and releasably secured to a web of backing material 12. The web 10 can be in conventional roll or fan-fold form. At a printing zone, two or more fields of data such as fields 13, 14 and 15 of data can be printed while the record members 11 are still on the backing material 12. As also shown in FIG. 2, each field 13, 14 and 15 has binary code machine readable data and, as is preferable, also human readable data. The binary code data is shown to be comprised of elongated bars of printing of different thicknesses and spacings. The invention is equally applicable to other and different binary codes, such as one in which the machine readable binary code is itself in a human readable arrangement as disclosed in U.S. Pat. No. 3,044,696.

In FIGS. 1 through 4, the machine readable binary code data printed on the record member 11 in each of the fields 13, 14 and 15 is shown to be adjacent corresponding human readable data. The field 13 is illustrated as containing one type of data relating to inventory control, the field 14 is illustrated as containing another type of data such as the style of the merchandise, and the field 15, which can be considered to be a price field, is illustrated as containing another type of information, namely, the price of the merchandise. The record member 11 is backed with adhesive 16 which attaches the record member 11 to the merchandise M.

Assuming that the record member 11 has been removed from the backing material 12 and attached to the merchandise M, and that it is desired either to raise or to lower the price of the merchandise M, another record member 17 in the form of a pressure sensitive label is provided; a price field 18 shown as including binary code machine readable price data and human readable price data is then printed on the record member 17. The binary code data in field 18 on the record member 17 is of the same binary code as the binary code data in fields 13, 14 and 15 on the record member 11. The record member 17 is backed with adhesive 17' which adheres the record member 17 to the record member 11. The adhesive 17' is of the permanent type; in the event the price is to be lowered for a sale, the adhesive 17' is preferably of the removable type to enable removal of the second record member 17 from the first record member 11 on unsold merchandise at the end of the sale. With the record member 17 adhered to the record member 11, only the binary code price data in the price field 15, binarily representing $5.95, on the record member 11 is covered. The illustrated human readable price data, namely $5.95, is still readable as the record member 17 does not cover it. The record member 17 is, however, sufficiently large so that the binary code data in the field 15 can be covered without the need for meticulous precision in applying the record member 17. As is evident, the permanent inventory and style data fields are not covered by the record member 17. When the re-price marked record member generally indicated at 11' is ready to be machine read as for example by a hand-held optical scanner, the fields 13 and 14 on the record member 11 and the field 18 on the record member 17 can be optically scanned.

The binary code price data and the human readable price data on the record member 17 is made visually distinguishable from the data on the record member 11, as by being different in color. For example, the color of the printing ink used to print the data on the record member can be black and the color of the printing ink used to print price data on the record member 17 can be red.

In the embodiment of FIGS. 5, 6 and 7, a tag 11a is attached to merchandise M by a fastener 19 such as a string or any other suitable fastener which passes through a hole 20 in the tag 11a. Fields 13a, 14a, and 15a comprise inventory, style and price fields. The record member 11a is constructed of conventional tag or ticket stock material.

Assuming it is desired either to raise or lower the price of the merchandise, a record member 17a in the form of a pressure sensitive label is provided. A price field 18a shown to include binary code machine readable price data and human readable price data is printed on the record member 17a. The second record member 17a is backed with adhesive 17a' which is permanent type, but in the event the price is to be lowered for a sale, the adhesive 17a' is preferably of the removable type to enable removal of the record member 17a from the record member 17a from the record member 11a or on unsold merchandise at the end of the sale. With the record member 17a adhered to the record member 11a both the binary code price data and the human readable price data in the field 15a are covered, a re-price marked record member 11a' results. The drawings indicate the price to have been raised from $5.95 to $6.95.

The embodiment of FIGS. 5 through 7 is the same as the embodiment shown in FIGS. 1 through 4, except that the new price is shown to be higher than the old price, the record member 11a is a tag or ticket which is attached to the merchandise M with a fastener, and record member 17a is shown to be large enough to cover the human readable price data in the price field 15a as well as the machine readable price data on the record member 11a.

Other embodiments and modifications of this invention will suggest themselves to those skilled in the art, and all such of these as come within the spirit of this invention are included within its scope as best defined by the appended claims.

I claim:

1. Method of re-price marking merchandise, comprising the steps of: providing a first record member, printing at least two fields of data on the first record member, one of the fields having coded machine readable data and another field being a price field having coded machine readable price data and corresponding human readable price data, attaching the record member to merchandise, thereafter providing a second record member, thereafter printing a price field of coded machine readable price data and corresponding human readable price data on the second record member, the price in the price field on the second record member being different from the price in the price field on the first record member, thereafter adhesively securing the second record member to the first record member so that at least the coded price data in the price field on the first record member but not the one field of coded data is covered by the second record member to provide a re-price marked record member, and scanning the re-price marked record member to read the coded data in the one field on the first record member and the coded price data in the price field on the second record member.

2. Method as defined in claim 1, wherein the price in the price field on the second record member is lower than the price in the price field on the first record member, the method further comprising the step of: thereafter removing the second record member from the first record member prior to the step of scanning so that the merchandise is again re-price marked up to the price appearing in the price field on the first record member.

3. Method as defined in claim 1, wherein the color of the printed data in the price field on the second record member is visually different from the color of the printed data in the price field on the first record member.

4. Method of re-price marking merchandise, comprising the steps of: printing at least two fields of data on a first record member, one of the fields having coded machine readable data and another field being a price field having coded machine readable price data and corresponding human readable price data, printing a price field of coded machine readable price data and corresponding human readable price data on a second record member, the price in the price field on the second record member being different from the price in the price field on the first record member, attaching the first record member to merchandise, and adhesively securing the second record member to the first record member so that at least the coded price data in the price field on the first record member but not the one field of coded data is covered by the second record member to provide a re-price marked record member.

5. Method as defined in claim 4, wherein the price in the price field on the second record member is lower than the price in the price field on the first record member, the method further comprising the steps of: thereafter removing the second record member from the first record member so that the merchandise is again re-price marked up to the price appearing in the price field on the first record member.

6. Method as defined in claim 4, wherein the color of the printed data in the price field on the second record member is visually distinguishable from the color of the printed data in the price field on the first record member.

7. Method as defined in claim 4, wherein the price in the price field on the second record member is lower than the price in the price field on the first record member, the second record member being adhered to the first record member so as to cover the coded price data but not the human readable price data on the first record member, the human readable price data on the second record member having a visually distinguishable characteristic from the human readable price data in the price field on the first record member.

8. Method as defined in claim 4, wherein the price in the price field on the second record member is higher than the price in the price field on the first record member, the second record member being adhered to the first record member so as to cover both the coded price data and the human readable price data on the first record member.

9. Method of re-price marking merchandise, comprising the steps of: printing at least two fields of data on a first record member, one of the fields having coded machine readable data and another field being a price field having coded machine readable price data, printing a price field of coded machine readable price data on a second record member, the price in the price field on the second record member being different from the price in the price field on the first record member, and thereafter adhesively securing the second record member to the first record member so that the coded price data in the price field on the first record member but not the one field of coded data is covered by the second record member to provide a re-price marked record member, the re-price marked record member being attached to the merchandise.

10. A re-price marked record member, comprising: a record member having at least two fields of data, one of the fields having coded machine readable data and another field being a price field having coded machine readable price data and corresponding human readable price data, means enabling the first record member to be attached to merchandise, and a second record member adhesively secured to the first record member and covering the coded data but not the one field of coded price data on the first record member, the price in the price field on the second record member being different from the price in the price field on the first record member.

11. A re-price marked record member as defined in claim 10, wherein the second record member is adhesively secured to the first record member by a removable type adhesive which enables the second record member to be removed from the first record member to again enable the coded data in the price field on the first record member to be read.

12. A re-price marked record member as defined in claim 10, wherein the color of the printed data in the price field on the second record member is visually distinguishable from the color of the printed data in the price field on the first record member.

13. A re-price marked record member as defined in claim 10, wherein the price in the price field on the second record member is lower than the price in the price field on the first record member, the second record member being adhered to the first record member so as to cover the coded price data but not the human readable price data on the first record member, the human readable price data on the second record member having a visually distinguishable characteristic from the human readable price data in the price field on the first record member.

14. A re-price marked record member as defined in claim 10, wherein the price in the price field on the second record member is higher than the price in the price field in the first record member, the second record member being adhered to the first record member and being large enough to cover both the coded price data and the human readable price data on the first record member.

15. A re-price marked record member comprising: a record member having at least two fields of data, one of the fields having coded machine readable data and another field being a price field having coded machine readable price data, means enabling the first record member to be attached to merchandise, and a second record member adhesively secured to the first record member and covering the coded data price but not the one field of coded data on the first record member, the price in the price field on the second record member being different from the price in the price field on the first record member.

16. A re-price marked record member as defined in claim 15, wherein the second member has a removable type adhesive applied to its underside so as to facilitate removal of the second record member from the first record member.

* * * * *